March 6, 1962     E. A. KUBIAK     3,024,027
PRESSURE LOADABLE FLUID SEAL DEVICE
Filed Feb. 17, 1958     2 Sheets-Sheet 1
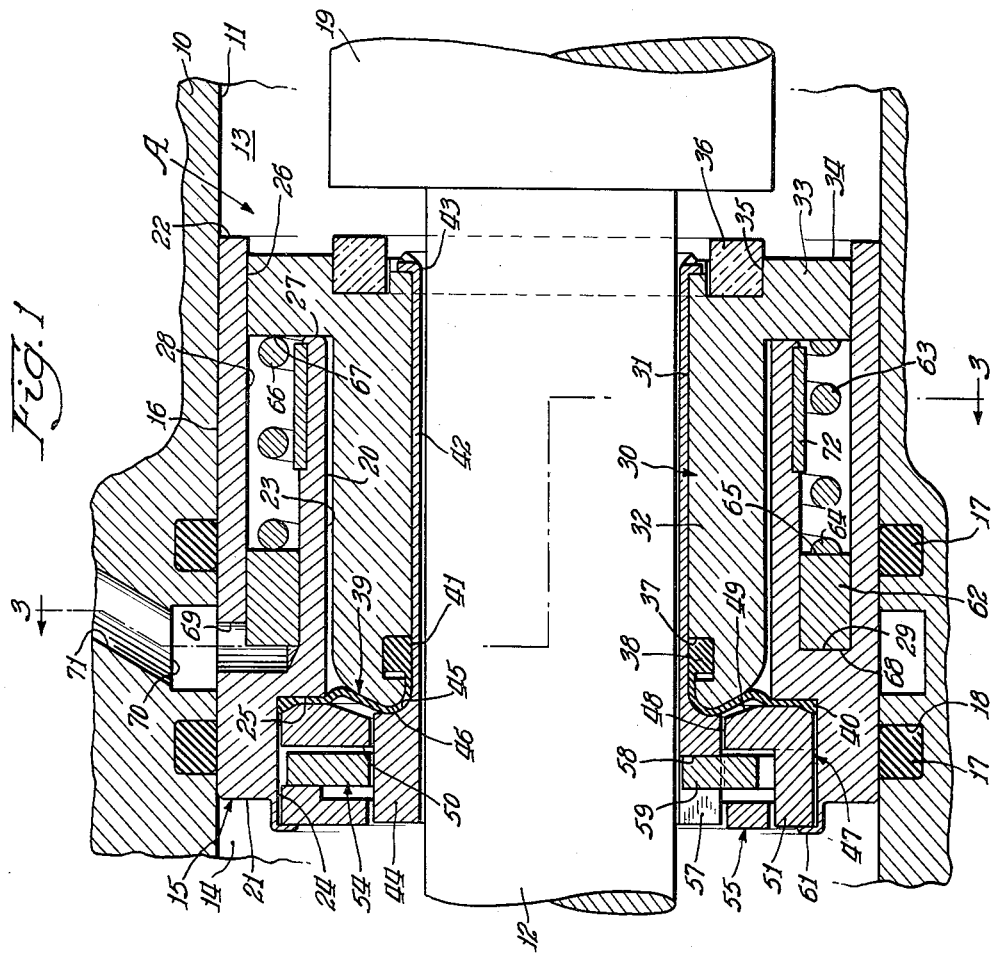
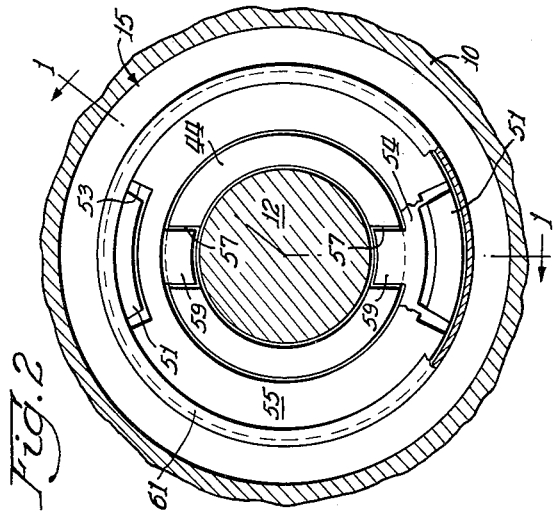
Inventor:
Emil A. Kubiak
By: Frank C. Parker Atty March 6, 1962    E. A. KUBIAK    3,024,027
PRESSURE LOADABLE FLUID SEAL DEVICE
Filed Feb. 17, 1958    2 Sheets-Sheet 2
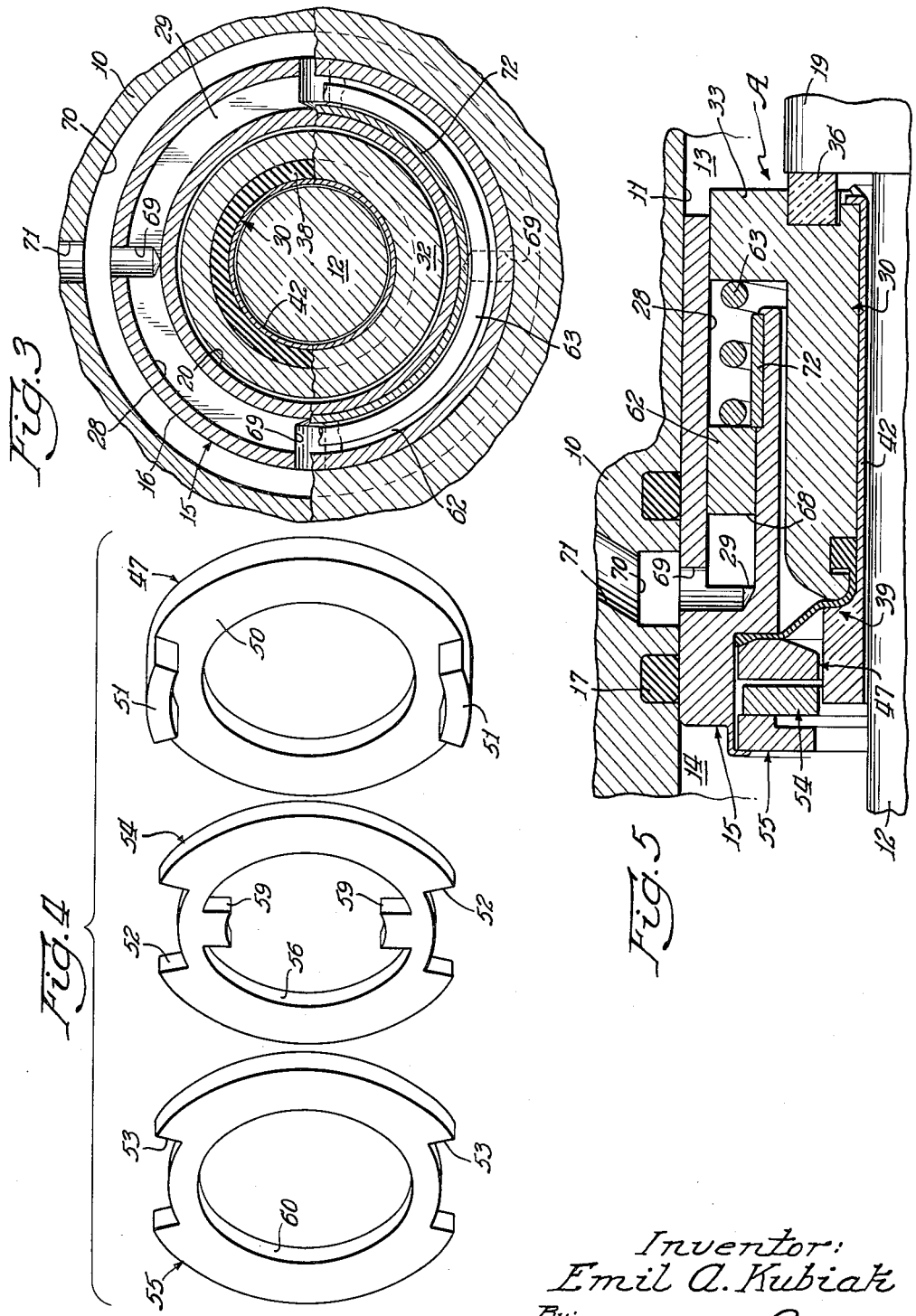
Inventor:
Emil A. Kubiak
By: Frank C. Parker Atty.

United States Patent Office 3,024,027
Patented Mar. 6, 1962

3,024,027
PRESSURE LOADABLE FLUID SEAL DEVICE
Emil A. Kubiak, Cleveland, Ohio, assignor to Borg-Warner Corporation, Chicago, Ill., a corporation of Illinois
Filed Feb. 17, 1958, Ser. No. 715,738
19 Claims. (Cl. 277—27)

This invention relates to a pressure loadable fluid seal device and, in particular, to a fluid seal device adapted to be telescopically disposed about a rotatable shaft disposed within a housing bore and adapted to sealably engage an internal surface of the housing, the internal surface being defined by a bore passing through the housing, whereby a part of the fluid seal device is adapted to be axially moved to sealably engage a rotatable member carried by the shaft to effectively isolate portions of the bore on each side of the fluid seal device from each other when one of the portions contains a pressure fluid, the effective sealing of the fluid seal device being controlled by the presence of the pressure fluid in one of the portions.

Normally, fluid seal devices of the type utilized in hydraulic pumps or other pressure fluid apparatus are adapted to be telescopically disposed within a housing bore and telescopically disposed about a rotatable shaft mounted in the housing bore to fluid seal or isolate portions of the bore on each side of the fluid seal device from each other. These fluid seal devices are each provided with a helical compression spring to bias a seal member carried by the device axially against a rotatable member carried by the shaft to provide the fluid sealing relation therewith. In fluid seals of the above described type, the rotating element is continuously engaged by the axially biased sealing member, whereby the sealing member is subject to wear caused by rotational friction and heat generated between the rotating element and the engaging non-rotatable sealing member. When there is sufficient fluid present in the portion of the bore containing the rotatable element and the fluid is adapted to form a film between the rotating element and the effective sealing face of the fluid seal member, the fluid will act as a lubricant therebetween and as a coolant to dissipate the heat generated to thereby reduce the tendency of the sealing face of the seal member to wear and also to reduce the tendency of the engaged surface of the rotating element itself to wear. The purpose of providing a sealing relationship between the seal device and the rotatable element is to prevent the escape of pressure fluid from one portion of the housing bore to the other which would cause a reduction in the pressure in that portion of the bore where it is desired to maintain a constant pressure or where it is desired that a pressure be permitted to build up. However, there are times when the rotatable element may be rotating and there is no pressure fluid present in the portion of the bore where the rotatable element is located. Because the fluid seal member is mechanicaly biased against the rotatable element during this "dry condition," there is no pressure fluid present to act as a lubricant between the sealing face of the sealing member and the rotatable element, thereby causing excessive wear. Further, the heat generated between the two dry rubbing surfaces enhances the tendancy of the surfaces to wear since there is no means present to dissipate the heat which would normally be dissipated by the pressure fluid during the "wet condition" when there is pressure fluid present in that portion of the bore.

Since the spring biased fluid seal device above described has the disadvantage of being subject to excessive wear during "dry conditions," chances of failure of the fluid pressure apparatus utilizing such fluid sealing devices are increased, thereby causing repair and replacement of the seals. Further, many types of pressure fluid apparatus are designed to have the drive shaft and working parts thereof continuously rotating although the presence of pressure fluid in the apparatus is intermittent. Such types are auxiliary fuel pumps that have the inlet thereof controlled by a valve to permit fuel to pass to the fuel pump only at selected times for additional power.

It is, therefore, one of the objects of this invention to provide a fluid seal device in which the fluid seal device provides effective sealing only when there is a condition requiring that sealing.

It is another object of this invention to provide a fluid seal device in which the fluid seal device is adapted to cooperate with a rotating element to provide a fluid seal therewith isolating the area on one side of the device from the area on the other side of the device only when a condition exists requiring the sealing effect thereof.

A further object of this invention is to provide a fluid seal device which is adapted to provide a fluid seal with a rotating element to prevent the passage of pressure fluid from one side of the non-rotating sealing device to the other when there is pressure fluid present on the sealing side of the fluid seal device.

Another object of this invention is to provide a fluid seal device which is adapted to have the sealing member thereof axialy moved relative to the device to engage a rotating element and provide a fluid seal therewith preventing the passage of pressure fluid present on the sealing side of the fluid seal device to the other side thereof, the fluid seal device including means whereby a portion of the pressure fluid present on the sealing side thereof is utilized to effect the axial movement of the sealing member of the seal device and including means whereby the sealing member is moved axially away from the rotatable element when there is no pressure fluid present on the sealing side of the fluid seal device.

It is another object of this invention to provide a pressure loadable fluid seal device for effecting a fluid seal between one portion of a bore formed in a housing and another portion of the bore where the fluid seal device is telescopically disposed about a rotatable shaft disposed in the bore, and the fluid seal device comprises a sleeve member sealably engaging the housing and a seal member, carried by the sleeve member, being adapted to be axially movable relative to the sleeve member and shaft to thereby engage a rotatable element carried by the shaft and provide a fluid seal therewith when there is pressure fluid present in the one portion of the bore and being adapted to be retracted out of engagement from the rotatable element when there is no pressure fluid present in the one portion of the bore.

Other and more particular objects, uses, and advantages of this invention will become apparent from a reading of the following specification taken in connection with the accompanying drawings which form a part thereof and wherein:

FIGURE 1 is an axial cross-sectional view of a fluid seal device incorporating features of this invention taken on line 1—1 of FIGURE 2.

FIGURE 2 is an end view of the fluid seal device illustrated in FIGURE 1.

FIGURE 3 is a cross-sectional view of the fluid seal device illustrated in FIGURE 1 taken on line 3—3 of FIGURE 1.

FIGURE 4 is an exploded perspective view of various elements utilized in the fluid seal device shown in FIGURES 1 to 3.

FIGURE 5 is a partial cross-sectional view of the fluid seal device incorporating features of this invention, similar to FIGURE 1, illustrating the sealing position of the fluid seal device.

Reference is now made to the drawings which illustrate one embodiment of this invention in the various figures thereof, wherein like reference numerals are used throughout to indicate like parts. Particular reference is made to FIGURE 1 wherein the fluid seal device, indicated generally by the reference character A, is sealably mounted within a housing 10, shown in fragmentary cross-section only, of a pressure fluid device such as a hydraulic pump. It is to be understood that any pressure fluid device may employ the fluid seal device A, the invention not being limited to a hydraulic pump.

The housing 10 is provided with a circular elongated bore 11 in which is mounted a rotatable shaft 12 by any suitable mounting means (not shown). The shaft 12 may be a drive shaft for a hydraulic pump in which the left end of the shaft 12 may be driven by any suitable power source and is adapted to project beyond the exterior of the housing 10. Since there may be pressure fluid present in the right portion or chamber 13 of the bore 11 caused by leakage from the pumping unit or because chamber 13 is a pumping chamber, it is desirable that the pressure fluid present in the portion 13 be confined therein without passing to the left portion or chamber 14 of the bore 10 which may be exposed to the atmosphere and would thereby cause a loss of pressure and fluid delivered by the pumping means located in the right portion 13 of the bore 11. The particular illustrated fluid seal device utilized to prevent this passage of pressure fluid, incorporating features that are deemed essential and form a part of this invention, will now be described.

The fluid seal device A comprises a substantially cylindrical sleeve 15 having the outer periphery 16 thereof adapted to be sealably affixed at a predetermined telescoped position within the bore 11 by annular O-ring seals 17 or other suitable sealing means disposed within annular grooves or recesses 18 formed in the housing 10. It should be understood that the recesses 18 could be formed in the outer peripheral surface 16 of the sleeve 15 and the O-ring seals 17 disposed therein; however, the preferred form is as illustrated. The sleeve 15 is positioned within the bore 11 at a predetermined spaced relation from an outwardly extending flange portion or rotatable element 19 formed either integrally with the shaft 12 or formed separately and suitably affixed to the rotatable shaft 12 where the flange portion 19 is rotated with the shaft 12. The sleeve 15 is provided with a central circular bore 20 passing through the entire axial length of the sleeve 15 from the left end 21 thereof to the right end 22 thereof forming an internal peripheral surface 23 of the sleeve 15. The sleeve 15 is also formed with a circular counterbore 24 at the left end 21 thereof, the counterbore 24 being coaxial with the bore 20 and terminating at a predetermined distance from the end 21 within the sleeve 15 forming a shoulder 25 in the sleeve 15 at the juncture of the bores 20 and 24. The right end 22 of the sleeve 15 is also provided with a coaxial counterbore 26 which terminates within the sleeve 15 at a predetermined distance from the end 22 forming a shoulder 27 at the juncture of the bores 20 and 26.

The sleeve 15 is provided with an annular bore 28 interrupting the shoulder 27 between the inner 23 and outer 16 peripheral surfaces and terminating within the sleeve 15 at a predetermined point 29 from the end 22 of the sleeve 15. The annular bore 28 is formed by milling or other suitable machine operation and is formed concentric with the bore 20 of the sleeve 15.

A cylindrical seal member 30, having a central circular bore 31 formed throughout the entire axial length of the seal member 30, is adapted to have the left portion 32 thereof telescopically received within the bore 20 of the sleeve 15. An outwardly extending flange or right portion 33, formed integrally with the left portion 32 of the seal member 30, is adapted to be telescopically received within the counterbore 28 of the sleeve 15. In this manner the seal member 30 is adapted to be telescopically received within the sleeve 15 to a predetermined telescoped relation defined by the outwardly extending flange 33 of the seal member 30 abutting the end or shoulder 27 of the sleeve 15. The forward or sealing face 34 of the seal member 30 is interrupted with an annular bore or recess 35, the recess 35 being formed concentrically with the bore 31. An annular ring 36 composed of a suitable sealing material, such as carbon, is disposed within the recess 35 of the sealing member 30 and is adapted to project beyond the sealing face 34 of the sealing member 30. In this manner the sealing ring 36 is so positioned that upon axial movement of the sealing member 30 relative to the sleeve 15 toward the right, as viewed in the drawing, the ring 36 will engage the rotatable element or flange 19 of the shaft 12 and provide a fluid seal therewith.

The left portion 32 of the seal member 30 is provided with an annular recess 37 adjacent the extreme left end thereof which is adapted to receive an enlarged annular end 38 of a resilient and flexible fluid seal member or diaphragm 39. The diaphragm 39 is formed in a thin disk-like shape having a circular outer edge 40 thereof and a central aperture 41 passing therethrough forming the inner enlarged end 38 concentric with the outer edge 40. The diaphragm 39 is also adapted to be attached to the sleeve 15 at its outer end or edge 40 by attaching means later to be described. Diaphragm 39 may be made of suitable flexible material, such as rubber, which will permit the seal member 30 to be moved axially relative to the sleeve 15 and have a resiliency that tends to urge the seal member 30 to the position illustrated in FIGURE 1.

The diaphragm 39 has the enlarged portion 38 thereof maintained within the recess 37 of the seal member 30 by means of a thin annular sleeve member 42 telescopically disposed within the bore 31 of the seal member 30 and disposed about the shaft 12. The extreme right end 43 of the sleeve member 42 is flared radially outwardly to engage the seal face 34 of the seal member 30. To suitably attach the flared portion 43 of the sleeve member 42 to the seal member 30, the flared portion 43 may be swaged thereto at various points (not shown). The left portion of the sleeve member 42 is provided with an enlarged outwardly extending flange 44 having a concave arcuately-shaped portion 45 thereof adapted to complement the convex arcuate portion 46 of the seal member 30 in retaining a portion of the diaphragm 39 therebetween. By providing the complementing arcuate portions 45 and 46, the diaphragm 39 will not be subject to any shear forces during the swaging of the sleeve member 42 to the seal face 34 of the seal member 30; and the diaphragm 39 will not be subject to shearing by sharp surfaces during the flexure thereof later to be described.

The means for attaching the diaphragm end 40 to the sleeve 15 will not be described. An annular ring 47 having a central bore 48 therein is adapted to be telescopically disposed about the enlarged flange portion 44 of the sleeve member 42 and is adapted to wedge the diaphragm 39 against the shoulder 25 of the sleeve 15 defined by the juncture of the bores 24 and 20 therein. The annular ring 47 may be formed with an irregular or serrated face 49 to further enhance the wedging of the diaphragm 39 to the sleeve 15. As shown in FIGURES 1 and 4, the other face 50 of the annular ring 47 is provided with opposed arcuate flange portions or projections 51 which are adapted to project through complementary arcuate cut out portions 52 and 53 formed respectively in annular rings 54 and 55 (see FIGURES 2 and 4). The annular ring 54 is adapted to be positioned adjacent the annular ring 47 and is provided with a central bore 56 permitting the annular ring 54 to be telescopically disposed about the enlarged portion 44 of the sleeve member 42. The enlarged portion 44 of the sleeve member 42 is provided with opposed radial slots 57 which terminate at a point 58 within the flange portion 44. The annular ring 54 is provided with two radially inwardly extending flange portions or keys 59 which are adapted to be received with the slots 57 of the sleeve member 42. The ring 54 thereby prevents the seal member 30 from being rotated relative to the sleeve 15 when the seal member is in frictional engagement with the rotating element 19 tending to cause the seal member 30 to rotate therewith. This rotational tendency of the seal member 30 is prevented by the interlocking effect of the ring 54. The keys 59 of the ring 54 are locked within the slots 57 of the sleeve member 42, and the ring member 54 is in turn locked to the ring 47 by means of the cooperation between the cut out portions 52 of the ring 54 and the projecting flanges 51 of the ring 47. The ring 54 is further indirectly locked to ring 55 by the locking effect of the projections 51 of ring 47 cooperating with the cut out portion 53 of ring 55. The ring 55, having a central bore 60 formed therein, whereby the ring 55 is adapted to be telescoped about the enlarged portion 44 of the sleeve member 42, is positioned adjacent the ring 54 and is utilized to pack the rings 47 and 54 together when the flange 61 of the sleeve 15 is turned over locking the diaphragm 39 and attaching rings 47, 54, and 55 together.

An annular piston-like ring 62 is disposed within the annular bore 28 of the sleeve 15 and is adapted to be movable relative to the sleeve 15 within the bore 28. A helical spring 63 is disposed within the bore 28 having one end 64 thereof engaging the forward face 65 of the piston means 62 and the other end 66 thereof engaging the back face 67 of the outwardly extending flange 33 of the seal member 30. The spring 63 is at its normal length, as illustrated in FIGURE 1, when the piston means 62 has the surface 68 thereof engaging the end 29 of the bore 28 and the flange 33 of the seal member 30 is engaging the end 27 of the annular bore 26 of the sleeve 15. The seal member 30 is surged and maintained in this position by the resilient qualities of the diaphragm 39 when the piston 62 is in its first position, i.e. when the piston 62 engages the end 29 of the annular bore 28.

The outer periphery 16 of the sleeve 15 is interrupted with a plurality of radial bores 69 which are adapted to interconnect the outer periphery 16 of the sleeve 15 with the annular bore 28. The passages or bores 69 are adapted to communicate with an annular recess or groove 70 formed within the housing 10 which in turn communicates by way of passage 71 with the discharge side of the pressure fluid generating device or pumping unit disposed in the housing 10 and driven by the shaft 12.

The operation of the fluid seal device A is as follows: referring to FIGURE 1, it is assumed that the shaft 12 and flange or element 19 are being rotated. If, as shown in FIGURE 1, there is no pressure fluid present in chamber 13, because the pumping unit driven by the shaft 12 is not pumping fluid under pressure, the fluid seal device A has the seal member 30 maintained in the telescoped position as shown as no discharge pressure fluid is communicated by passage 71 to the motive surface 68 of the piston means 62. Therefore, the piston means 62 remains at its first position against the stop means provided by the end 29 of the bore 28. When pressure fluid is generated by the pumping unit and is present in the right portion 13 of the bore 11 by means of leakage or other means, the pressure fluid that has leaked into the chamber 13 having a pressure value smaller than the pressure value of the discharge pressure of the pumping unit, the discharge pressure fluid is communicated from the discharge side of the pumping unit by means of passage 71, annular groove 70, and passages 69 to the motive surface 68 of the piston means 62. The force of the pressure fluid acting on the motive surface 68 of the piston means 62 causes the piston means 62 to move axially to the right relative to the sleeve 15 (See FIGURE 5) and compress the spring 63 between the piston means 62 and flange 33 of the seal member 30. The axial movement of the piston means 62 to the right by the force of the pressure fluid is limited to a second position of the piston means 62 by another stop means formed by an annular sleeve ring 72 press fitted on the right end of the sleeve 15 within the bore 28. In this manner, when the piston means 62 moves from its first position to its second position, defined by the stop means 29 and 72 respectively, the compressed spring 63 urges the seal member 30 axially to the right. The compression force of the spring 63 is greater than the resilient force of the diaphragm 39, thereby causing the seal member 30 to be axially moved to the right until the annular sealing ring 36, carried by the seal member 30, abuts the rotating element 19 of the shaft 12. The spring 62 is still under compression when the piston means 62 abuts the stop sleeve 72, and the annular ring 36 is engaging the rotating element 19. In this manner the compression force of spring 63, tending to urge the seal member 30 to the right, is greater than the force of the diaphragm 39, tending to urge the seal member 30 to the left, thereby causing the annular seal ring 36 to engage the rotating element 19 with sufficient force to provide an adequate sealing relation therewith. As long as pressure fluid is being generated by the pumping unit and thus causes fluid to be present in the portion 13 of the bore 11 through fluid leakage, the ring 36 is urged into sealing engagement with the rotating element 19. Any tendency of the pressure fluid to seep between the telescoped members 15 and 30 is prevented from reaching the left portion 14 of the bore 11 by means of the seal diaphragm 39. Also, any tendancy of pressure fluid to seep between the housing 10 and sleeve 15 is prevented by the O-ring seals 17. The annular ring 33, of course, prevents any leakage of pressure fluid between the seal member 30 and sleeve member 42 and also between the sleeve member 42 and the telescoped shaft 12. It can be seen that an adequate fluid sealing of chamber 13 from chamber 14 has been provided by the fluid seal device A when pressure fluid is present in chamber 13.

When the pressure fluid within portion or chamber 13 of the bore 11 should cease to exist, either through failure of the pumping means or by other means such as desired idling or free-wheeling of the pump, the piston means 62 is urged to the left by the compression force of the spring 63 as the discharge pressure fluid delivered by the pumping unit to the motive surface 68 of the piston means 62 is terminated.

Since the spring 63 is now permitted to expand to its normal length, the diaphragm 39 now urges the seal member 30 to its retracted or fully telescoped position within the sleeve 15, as illustrated in FIGURE 1. In this manner the annular ring 36 has been completely disengaged from the rotating element 19, thereby preventing any excessive wear thereof. Since it is not necessary to fluid seal the portion or chamber 13 from the portion or chamber 14 when pressure fluid is not present in chamber 13, the fluid seal device A, by being disengaged from its sealing relation with the rotating element 19, is thus prevented from being worn out.

As can be seen, this invention has provided a relatively simple and easy-to-manufacture fluid seal device which provides a fluid seal only when pressure fluid conditions require the sealing effect thereof and prevents the fluid seal device from providing a seal under "dry conditions" when there is no apparent necessity for a sealing relation.

Where parts are designated as moving to the right or left or being located at the right end or left end in the above description, it is to be understood that this is merely to facilitate description when referring to the one embodiment of this invention illustrated in the drawings and is not intended to be a limitation on this invention.

While only one embodiment of this invention has been disclosed, it is to be understood that this is by way of example only, rather than limitation; and it is apparent that many modifications and changes may be made thereto without departing from the spirit of this invention as defined by the appended claims.

What is claimed is:

1. A pressure loadable fluid seal device comprising: a first member; a second member being adapted to be movable relative to said first member; means defining bore means passing through said first member and second member whereby said seal device is adapted to be telescopically disposed about a rotatable shaft passing through said bore means and said second member is adapted to be axially movable relative to said shaft; piston means carried by said first member, said piston means being adapted to be movable relative to said first member from a first position to a second position; biasing means interposed between said piston means and said second member whereby said second member is biased to a first predetermined position relative to said first member when said piston means is in its said first position; and means interconnecting said piston means with a fluid pressure source whereby said piston means is adapted to be moved relative to said first member to its said second position when the application of said pressure fluid acts on said piston means thereby causing said second member to be biased to a second predetermined position relative to said first member and thus providing said fluid seal.

2. A pressure loadable fluid seal device comprising: a first member; a second member being adapted to be movable relative to said first member; piston means carried by said first member, said piston means being adapted to be movable relative to said first member from a first position to a second position; a first biasing means interposed between said piston means and said second member whereby said second member is biased to a first predetermined position relative to said first member by said first biasing means when said piston means is in its said first position; means interconnecting said piston means with a fluid pressure source whereby said piston means is adapted to be moved relative to said first member when the application of said pressure fluid acts on said piston means thereby causing said second member to be biased to a second predetermined position relative to said first member by said first biasing means and thus providing said fluid seal; and a second biasing means connected at one end thereof to said first member and connected at the other end thereof to said second member whereby said second member is adapted to be biased to its said first predetermined position by said second biasing means when said piston means is returned to its said first position by said first biasing means upon the discontinuance of said application of pressure fluid to said piston means thereby terminating said fluid seal.

3. A pressure loadable fluid seal device comprising: a first member; a second member being adapted to be movable relative to said first member; piston means carried by said first member, said piston means being adapted to be movable relative to said first member from a first position to a second position; spring means interposed between said piston means and said second member whereby said second member is biased to a first predetermined position relative to said first member by said spring means when said piston means is in its said first position; means interconnecting said piston means with a fluid pressure source whereby said piston means is adapted to be moved relative to said first member when the application of said pressure fluid acts on said piston means thereby causing said second member to be biased to a second predetermined position relative to said first member by said spring means and thus providing said fluid seal; and a resilient sealing device connected at one end thereof to said first member and connected at the other end thereof to said second member whereby said second member is adapted to be biased to its said first predetermined position by said sealing device when said piston means is returned to its first position by said spring means upon the discontinuance of said application of pressure fluid to said piston means thereby terminating said fluid seal.

4. A pressure loadable fluid seal device comprising: a first member; a second member being adapted to be movable relative to said first member; spaced stop means carried by said first member; piston means carried by said first member, said piston means being adapted to be movable relative to said first member between said stop means whereby said piston means is in a first position when said piston means engages one of said stop means and is in a second postiion when said piston means engages another of said stop means; biasing means interposed between said piston means and said second member whereby said second member is biased to a first predetermined position relative to said first member when said piston means is in its said first position; and means interconnecting said piston means with a fluid pressure source whereby said piston means is adapted to be moved relative to said first member to its said second position when the application of said pressure fluid acts on said piston means thereby causing said second member to be biased to a second predetermined position relative to said first member and thus providing said fluid seal.

5. A pressure loadable fluid seal device adapted to provide a fluid seal comprising: a first member; means defining a bore in said first member; a second member telescopically received in said bore and being adapted to be movable relative to said first member; piston means carried by said first member, said piston means being adapted to be movable relative to said first member from a first position to a second position; biasing means interposed between said piston and said second member, said biasing means engaging said piston means at one end thereof and engaging said second member at the other end thereof whereby said second member is biased to a first predetermined telescoped position relative to said first member when said piston means is in its said first position; and means interconnecting said piston means with a pressure fluid source whereby said piston means is adapted to be moved relative to said first member to its said second position thereof when the application of said pressure fluid acts on said piston means thereby causing said second member to be biased to a second predetermined telescoped position relative to said first member and thus providing said fluid seal.

6. A pressure loadable fluid seal device adapted to provide a fluid seal comprising: a first member; means defining a bore in said first member; a second member telescopically received in said bore and being adapted to be movable relative to said first member; means defining a bore passing through said second member whereby said seal device is adapted to be telescopically disposed about a rotatable shaft passing through said bore in said second member and said second member is adapted to be axially movable relative to said shaft; piston means carried by said first member, said piston means being adapted to be movable relative to said first member from a first position to a second position; biasing means interposed between said piston and said second member, said biasing means engaging said piston means at one end thereof and engaging said second member at the other end thereof whereby said second member is biased to a first predetermined telescoped position relative to said first member when said piston means is in its said first position; and means interconnecting said piston means with a pressure fluid source whereby said piston means is adapted to be moved relative to said first member to its said second position thereof when the application of said pressure fluid acts on said piston means thereby causing said second member to be biased to a second predetermined telescoped position relative to said first member and thus providing said fluid seal.

7. A pressure loadable fluid seal device adapted to provide a fluid seal comprising: a first member; means defining a bore in said first member; a second member telescopically received in said bore and being adapted to be movable relative to said first member; piston means carried by said first member, said piston means being adapted to be movable relative to said first member from a first position to a second position; a first biasing means interposed between said piston and said second member, said first biasing means engaging said piston means at one end thereof and engaging said second member at the other end thereof whereby said second member is biased to a first predetermined telescoped position relativ to said first member by said first biasing means when said piston means is in its said first position; means interconnecting said piston means with a pressure fluid source whereby said piston means is adapted to be moved relative to said first member to its said second position thereof when the application of said pressure fluid acts on said piston means thereby causing said second member to be biased to a second predetermined telescoped position relative to said first member by said first biasing means and thus providing said fluid seal; and a second biasing means connected at one end thereof to said first member and connected at the other end thereof to said second member whereby said second member is adapted to be biased to its said first predetermined telescoped position by said second biasing means when said piston means is returned to its said first position by said first biasing means upon the discontinuance of said application of pressure fluid to said piston means thereby terminating said fluid seal.

8. A pressure loadable fluid seal device adapted to provide a fluid seal comprising: a first member; means defining a bore in said first member; a second member telescopically received in said bore and being adapted to be movable relative to said first member; piston means carried by said first member, said piston means being adapted to be movable relative to said first member from a first position to a second position; spring means interposed between said piston and said second member, said spring means engaging said piston means at one end thereof and engaging said second member at the other end thereof whereby said second member is biased to a first predetermined telescoped position relative to said first member by said spring means when said piston means is in its said first position; means interconnecting said piston means with a pressure fluid source whereby said piston means is adapted to be moved relative to said first member to its said second position thereof when the application of said pressure fluid acts on said piston means thereby causing said second member to be biased to a second predetermined telescoped position relative to said first member by said spring means and thus providing said fluid seal; and a resilient sealing device connected at one end thereof to said first member and connected at the other end thereof to said second member whereby said second member is adapted to be biased to its said first predetermined telescoped position by said sealing device when said piston means is returned to its said first position by said spring means upon the discontinuance of said application of pressure fluid to said piston means thereby terminating said fluid seal.

9. A pressure loadable fluid seal device adapted to provide a fluid seal comprising: a first member; means defining a bore in said first member; a second member telescopically received in said bore and being adapted to be movable relative to said first member; spaced stop means carried by said first member; piston means carried by said first member, said piston means being adapted to be movable relative to said first member between said stop means whereby said piston means is in a first position when piston means engages one of said stop mean and is in a second position when said piston means engages another of said stop means; biasing means interposed between said piston and said second member, said biasing means engaging said piston means at one end thereof and engaging said second member at the other end thereof whereby said second member is biased to a first predetermined telescoped position relative to said first member when said piston means is in its said first position; and mean interconnecting said piston means with a fluid pressure source whereby said piston means is adapted to be moved relative to said first member to its said second position thereof when the application of said pressure fluid acts on said piston means thereby causing said second member to be biased to a second predetermined telescoped position relative to said first member and thus providing said fluid seal.

10. A pressure loadable fluid seal device comprising: a sleeve having spaced opposed ends and an outer surface thereof defined between said opposed ends; means defining a first bore interrupting one end of said opposed ends forming an inner surface of said sleeve, said inner surface being spaced from said outer surface; means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end thereof adjacent said second bore at said one end of said sleeve; biasing means disposed in said second bore, said biasing means engaging one side of said opposed sides of said piston at òne end thereof and said enlarged end of said seal member at the other end thereof whereby said seal member is biased to a first predetermined telescoped position relative to said sleeve when said piston means is in its said first position; and means defining passage means in said sleeve interconnecting the other side of said opposed sides of said piston with the outer surface of said sleeve whereby pressure fluid is adapted to be communicated by said passage means to said other side of said piston and cause movement of said piston to its second position thereby causing said seal member to be biased to a second predetermined telescoped position relative to said sleeve and thus providing said fluid seal.

11. A pressure loadable fluid seal device comprising: a sleeve having spaced opposed ends and an outer surface thereof defined between said opposed ends; means defining a first bore interrupting one end of said opposed ends forming an inner surface of said sleeve, said inner surface being spaced from said outer surface; means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end thereof adjacent said second bore at said one end of said sleeve; a first biasing means disposed in said second bore, said first biasing means engaging one side of said opposed sides of said piston at one end thereof and said enlarged end of said seal member at the other end thereof whereby said seal member is biased to a first predetermined telescoped position relative to said sleeve by said first biasing means when said piston means is in its said first position; means defining passage means in said sleeve interconnecting the other side of said opposed sides of said piston with the outer surface of said sleeve whereby pressure fluid is adapted to be communicated by said passage means to said other side of said piston and cause movement of said piston to its second position thereby causing said seal member to be biased to a second predetermined telescoped position relative to said sleeve by said first biasing means and thus providing said fluid seal; and a second biasing means connected at one end thereof to said sleeve and connected at the other end thereof to said seal member whereby said seal member is adapted to be biased to its said first predetermined telescoped position by said second biasing means when said piston means is returned to its said first position by said first biasing means upon the discontinuance of said application of pressure fluid to said piston means thereby terminating said fluid seal.

12. A pressure loadable fluid seal device comprising: a sleeve having spaced opposed ends and an outer surface thereof defined between said opposed ends; means defining a first bore interrupting one end of said opposed ends forming an inner surface of said sleeve, said inner surface being spaced from said outer surface, means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end thereof adjacent said second bore at said one end of said sleeve; spring means disposed in said second bore, said spring means engaging one side of said opposed sides of said piston at one end thereof and said enlarged end of said seal member at the other end thereof whereby said seal member is biased to a first predetermined telescoped position relative to said sleeve by said spring means when said piston means is in its said first position; means defining passage means in said sleeve interconnecting the other side of said opposed sides of said piston with the outer surface of said sleeve whereby pressure fluid is adapted to be communicated by said passage means to said other side of said piston and cause movement of said piston to its second position thereby causing said seal member to be biased to a second predetermined telescoped position relative to said sleeve by said spring means and thus providing said fluid seal; and a resilient sealing device connected at one end thereof to said sleeve and connected at the other end thereof to said seal member whereby said seal member is adapted to be biased to its said first predetermined telescoped position by said sealing device when said piston means is returned to its said first position by said spring means upon the discontinuance of said application of pressure fluid to said piston means thereby terminating said fluid seal.

13. A pressure loadable fluid seal device comprising: a sleeve having spaced opposed ends and an outer surface thereof defined between said opposed ends; means defining a first bore interrupting one end of said opposed ends forming an inner surface of said sleeve, said inner surface being spaced from said outer surface; means defining a second bore interrupting said one end intermediate said inner and outer surfaces; spaced stop means disposed in said second bore; piston means having opposed sides disposed in said second bore, said piston means being adapted to be movable relative to said sleeve between said stop means whereby said piston means is in a first position when said piston means engages one of said stop means and is in a second position when said piston means engages another of said stop means; a seal member telescopically disposed in said first bore and being adapted to be movable relative to said sleeve, said seal member having an enlarged end thereof adjacent said second bore at said one end of said sleeve; biasing means disposed in said second bore, said biasing means engaging one side of said opposed sides of said piston at one end thereof and said enlarged end of said seal member at the other end thereof whereby said seal member is biased to a first predetermined telescoped position relative to said sleeve when said piston means is in its said first position; and means defining passage means in said sleeve interconnecting the other side of said opposed sides of said piston with the outer surface of said sleeve whereby pressure fluid is adapted to be communicated by said passage means to said other side of said piston and cause movement of said piston to its second position thereby causing said seal member to be biased to a second predetermined telescoped position relative to said sleeve and thus providing said fluid seal.

14. A pressure loadable fluid seal device comprising: a sleeve having spaced opposed ends and an outer surface thereof defined between said opposed ends; means defining a first bore interrupting one end of said opposed ends forming an inner surface of said sleeve, said inner surface being spaced from said outer surface; means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end thereof adjacent said second bore at said one end of said sleeve; means defining a bore passing through said seal member whereby said seal device is adapted to be telescopically disposed about a rotatable shaft and said seal member is adapted to be axially movable relative to said shaft; biasing means disposed in said second bore, said biasing means engaging one side of said opposed sides of said piston at one end thereof and said enlarged end of said seal member at the other end thereof whereby said seal member is biased to a first predetermined telescoped position relative to said sleeve when said piston means is in its said first position; and means defining passage means in said sleeve interconnecting the other side of said opposed sides of said piston with the outer surface of said sleeve whereby pressure fluid is adapted to be communicated by said passage means to said other side of said piston and cause movement of said piston to its second position thereby causing said seal member to be biased to a second predetermined telescoped position relative to said sleeve and thus providing said fluid seal.

15. A pressure loadable fluid seal device for effecting a fluid seal between one portion of a bore formed in a housing and another portion of said bore where said seal cooperates with a rotatable member disposed in said one portion to provide said fluid seal when said one portion has pressure fluid therein resulting from fluid leakage from a pressure fluid generating device driven by said rotatable member and comprising: a sleeve having spaced opposed ends and an outer surface thereof defined between said opposed ends, said sleeve being adapted to be sealably and stationarily mounted within said housing bore and having one end of said opposed ends thereof spaced from said rotatable member; means defining a first bore interrupting said one end of said sleeve forming an inner surface of said sleeve, said inner surface being spaced from said outer surface; means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end adjacent said second bore at said one end of said sleeve; biasing means disposed in said second bore, said biasing means engaging one side of said opposed sides of said piston at one end thereof and engaging said enlarged end of said seal member at the other end thereof whereby said seal member is biased to a first predetermined telescoped position thereof relative to said sleeve when said piston means is in its said first position and is spaced from said rotatable member; and means defining passage means in said sleeve interconnecting the other side of said opposed sides of said piston with the outer surface of said sleeve, said passage means being adapted to be interconnected with said pressure fluid generating device whereby said other side of said piston is subject to the application of pressure fluid discharged from said pressure fluid generating device, the force of which causes movement of said piston to its second position thereby causing said seal member to be biased to a second telescoped position relative to said sleeve thereby causing said seal member to engage said rotary member and provide said fluid seal therewith.

16. A pressure loadable fluid seal device for effecting a fluid seal between one portion of a bore formed in a housing and another portion of said bore where said seal cooperates with a rotatable member disposed in said one portion to provide said fluid seal when said one portion has pressure fluid therein resulting from fluid leakage from a pressure fluid generating device driven by said rotatable member and comprising: a sleeve having spaced opposed ends and an outer surface thereof defined between said opposed ends, said sleeve being adapted to be sealably and stationarily mounted within said housing bore and having one end of said opposed ends thereof spaced from said rotatable member; means defining a first bore interrupting said one end of said sleeve forming an inner surface of said sleeve, said inner surface being spaced from said outer surface; means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end adjacent said second bore at said one end of said sleeve; a first biasing means disposed in said second bore, said first biasing means engaging one side of said opposed sides of said piston at one end thereof and engaging said enlarged end of said seal member at the other end thereof whereby said seal member is biased to a first predetermined telescoped position thereof relative to said sleeve by said first biasing means when said piston means is in its said first position and is spaced from said rotatable member; means defining passage means in said sleeve interconnecting the other side of said opposed sides of said piston with the outer surface of said sleeve, said passage means being adapted to be interconnected with said pressure fluid generating device whereby said other side of said piston is subject to the application of presure fluid discharged from said pressure fluid generating device, the force of which causes movement of said piston to its second position by said first biasing means thereby causing said seal member to be biased to a second telescoped position relative to said sleeve thereby causing said seal member to engage said rotary member and provide said fluid seal therewith; and a second biasing means connected at one end thereof to said sleeve and connected at the other end thereof to said seal member whereby said seal member is adapted to be biased to its said first predetermined telescoped position by said second biasing means when said piston means is returned to its said first position by said first biasing means upon the discontinuance of pressure fluid to said piston means thereby terminating said fluid seal.

17. A pressure loadable fluid seal device for effecting a fluid seal between one portion of a bore formed in a housing and another portion of said bore where said seal cooperates with a rotatable member disposed in said one portion to provide said fluid seal when said one portion has pressure fluid therein resulting from fluid leakage from a pressure fluid generating device driven by said rotatable member and comprising: a sleeve having spaced opposed ends and an outer surface thereof defined between said opposed ends, said sleeve being adapted to be sealably and stationarily mounted within said housing bore and having one end of said opposed ends thereof spaced from said rotatable member; means defining a first bore interrupting said one end of said sleeve forming an inner surface of said sleeve, said inner surface being spaced from said outer surface; means defining a second bore interrupting said one end intermediate said inner and outer surfaces; piston means having opposed sides disposed in said second bore, said piston means being adapted to be movable relative to said sleeve from a first position to a second position; a seal member telescopically disposed in said first bore and being adapted to be movable relative to said sleeve, said seal member having an enlarged end adjacent said second bore at said one end of said sleeve; spring means disposed in said second bore, said spring means engaging one side of said opposed sides of said piston at one end thereof and engaging said enlarged end of said seal member at the other end thereof whereby said seal member is biased to a first predetermined telescoped position thereof relative to said sleeve by said spring means when said piston means is in its said first position and is spaced from said rotatable member; and means defining passage means in said sleeve interconnecting the other side of said opposed sides of said piston with the outer surface of said sleeve, said passage means being adapted to be interconnected with said pressure fluid generating device whereby said other side of said piston is subject to the application of pressure fluid discharged from said pressure generating device, the force of which causes movement of said piston to its second position by said spring means thereby causing said seal member to be biased to a second telescoped position relative to said sleeve thereby causing said seal member to engage said rotary member and provide said fluid seal therewith; and a resilient sealing means connected at one end thereof to said sleeve and connected at the other end thereof to said seal member whereby said seal member is adapted to be biased to its said first predetermined telescoped position by said sealing means when said piston means is returned to its said first position by said spring means upon the discontinuance of said application of pressure fluid to said piston means thereby terminating said fluid seal.

18. A pressure loadable fluid seal device for effecting a fluid seal between one portion of a bore formed in a housing and another portion of said bore where said seal cooperates with a rotatable member disposed in said one portion to provide said fluid seal when said one portion has presure fluid therein resulting from fluid leakage from a pressure fluid generating device driven by said rotatable member and comprising: a sleeve having spaced opposed ends and an outer surface thereof defined between said opposed ends, said sleeve being adapted to be sealably and stationarily mounted within said housing bore and having one end of said opposed ends thereof spaced from said rotatable member; means defining a first bore interrupting said one end of said sleeve forming an inner surface of said sleeve, said inner surface being spaced from said outer surface; means defining a second bore interrupting said one end intermediate said inner and outer surfaces; spaced stop means disposed in said second bore; piston means having opposed sides disposed in said second bore, said piston means being adapted to be movable relative to said sleeve between said stop means whereby said piston means is in a first position when said piston means engages one of said stop means and is in a second position when said piston means engages another of said stop means; a seal member telescopically disposed in said first bore and being adapted to be movable relative to said sleeve, said seal member having an enlarged end adjacent said second bore at said one end of said sleeve; biasing means disposed in said second bore, said biasing means engaging one side of said opposed sides of said piston at one end thereof and engaging said enlarged end of said seal member at the other end thereof whereby said seal member is biased to a first predetermined telescoped position thereof relative to said sleeve when said piston means is in its said first position and is spaced from said rotatable member; and means defining passage means in said sleeve interconnecting the other side of said opposed sides of said piston with the outer surface of said sleeve, said passage means being adapted to be interconnected with said pressure fluid generating device whereby said other side of said piston is subject to the application of pressure fluid discharged from said pressure fluid generating device, the force of which causes movement of said piston to its second position thereby causing said seal member to be biased to a second telescoped portion relative to said sleeve thereby causing said seal member to engage said rotary member and provide said fluid seal therewith.

19. A pressure loadable fluid seal device for effecting a fluid seal between one portion of a bore formed in a housing and another portion of said bore where said seal device is telescopically disposed about a rotatable shaft and cooperates with a rotatable member carried by said shaft and disposed in said one portion to provide said fluid seal therewith when said one portion has pressure fluid therein resulting from fluid leakage from a pressure fluid generating device driven by said shaft and comprising: a sleeve having spaced opposed ends and an outer surface thereof defined between said opposed ends, said sleeve being adapted to be sealably and stationarily mounted within said housing bore and having one end of said opposed ends thereof spaced from said rotatable member; means defining a first bore interrupting said one end of said sleeve forming an inner surface of said sleeve, said inner surface being spaced from said outer surface; means defining a second bore interrupting said one end intermediate said inner and outer surfaces; piston means having opposed sides disposed in second bore, said piston means being adapted to be movable relative to said sleeve from a first position to a second position; a seal member telescopically disposed in said first bore and being adapted to be movable relative to said sleeve, said seal member having an enlarged and adjacent said second bore at said one end of said sleeve; means defining a bore in said seal member whereby said shaft is adapted to be received in said bore and rotatable therein and said seal member is adapted to be axially movable relative to said shaft; biasing means disposed in said second bore, said biasing means engaging one side of said opposed sides of said piston at one end thereof and engaging said enlarged end of said seal member at the other end thereof whereby said seal member is biased to a first predetermined telescoped position thereof relative to said sleeve when said piston means is in its said first position and is spaced from said rotatable member; and means defining passage means in said sleeve interconnecting the other side of said opposed sides of said piston with the outer surface of said sleeve, said passage means being adapted to be interconected with said pressure fluid generating device whereby said other side of said piston is subject to the application of pressure fluid discharged from said pressure fluid generating device, the force of which causes movement of said piston to its second position thereby causing said seal member to be biased to a second telescoped position relative to said sleeve thereby causing said seal member to engage said rotary member and provide said fluid seal therewith.

References Cited in the file of this patent

UNITED STATES PATENTS

| | | |
|---|---|---|
| 2,677,328 | Vitek | May 4, 1954 |
| 2,738,996 | Andersson | Mar. 20, 1956 |
| 2,807,483 | Cornelius | Sept. 24, 1957 |
| 2,818,285 | Griener | Dec. 31, 1957 |

FOREIGN PATENTS

| | | |
|---|---|---|
| 746,416 | Great Britain | Mar. 14, 1956 |